United States Patent [19]

Atkinson et al.

[11] 4,118,061
[45] Oct. 3, 1978

[54] VEHICLE SEAT ASSEMBLY

[75] Inventors: Thomas Carl Atkinson, Chula Vista, Calif.; Clifford C. Fay, Uniondale, Pa.

[73] Assignee: Rohr Industries, Inc., Chula Vista, Calif.

[21] Appl. No.: 818,939

[22] Filed: Jul. 25, 1977

[51] Int. Cl.² .................................................. A47C 7/02
[52] U.S. Cl. ........................................ 296/63; 297/450
[58] Field of Search ................... 296/63, 64; 297/450, 297/451, 452, 453, 454, 244, 422

[56] References Cited

U.S. PATENT DOCUMENTS

| | | | |
|---|---|---|---|
| 3,619,006 | 11/1971 | Barecki | 297/450 |
| 3,625,565 | 12/1971 | Barecki | 297/450 |
| 3,748,012 | 7/1973 | Abelman | 297/422 X |
| 3,944,283 | 3/1976 | Molzon | 297/450 X |

Primary Examiner—Joseph F. Peters, Jr.
Assistant Examiner—Gene A. Church
Attorney, Agent, or Firm—Patrick J. Schlesinger; Frank D. Gilliam

[57] ABSTRACT

A vehicle seat assembly having adaptability for use as both a side facing seat positioned along the side walls of various model vehicles and as a front facing seat along the rear wall of various model vehicles. The assembly has a plurality of seat modules, the combination being any mix of the single occupant or double occupant variety. Each of the seat modules has a shell-like structure with a back portion and a seat portion, both of which have a concave outer contour configured to receive a human body. Side flanges are integrally formed along the edges of the seat and back portions. A plurality of end arm members are provided and each has a panel section and inwardly extending flanges for supportably contacting the side flanges of the seat module. The arm member flanges have a back portion support flange and a seat portion support flange. Interlocking structure is formed on the rear of the end arm members for engaging interlocking structure on the front of seat mounting adaptor members. The seat modules are molded from polycarbonate structural foam. The interlocking structure on the rear of the end arm member is a pair of spaced vertical channels that receive a pair of spaced vertically extended ridges on the seat mounting adaptor members. The interlocking structure also has a plurality of vertically spaced T-shaped fingers on the rear of the arm member that are horizontally oriented to interlock with the plurality of vertically spaced T-shaped slots on the front of the seat mounting adaptor members. By using seat mounting adaptor members of various lengths, the standard seat modules may be used to form various vehicle seat assemblies that would have a different lateral spacing from the vehicle side wall.

10 Claims, 16 Drawing Figures

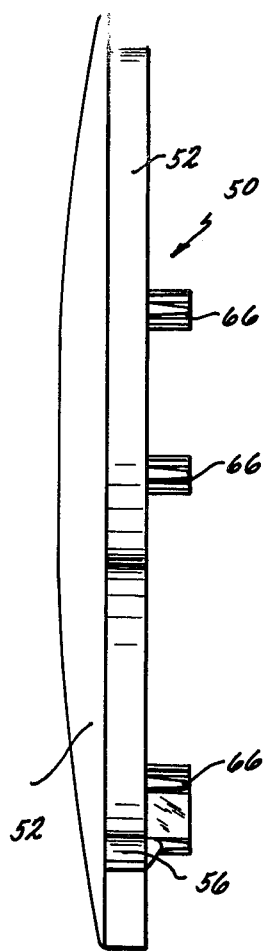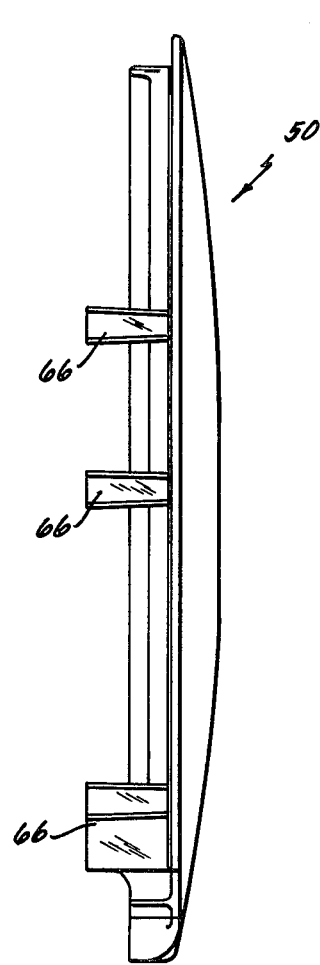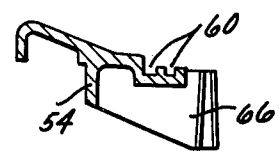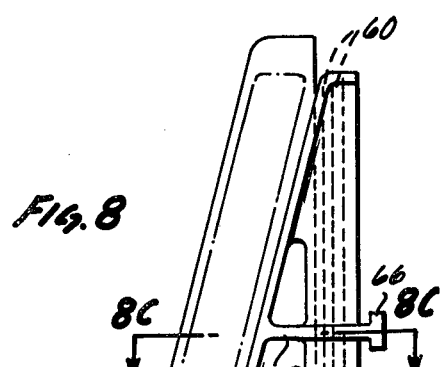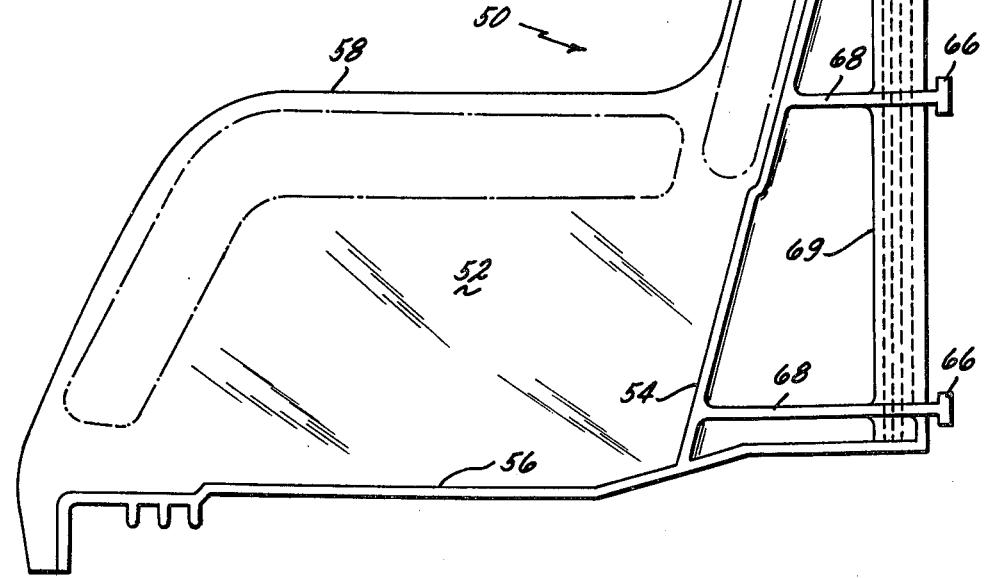

VEHICLE SEAT ASSEMBLY

BACKGROUND OF THE INVENTION

The invention relates generally to a vehicle seat assembly and more particularly to a minimal number of standard components that can be assembled to form vehicle sidewall and rear seats of various lengths that are also adaptable for use where the seat assemblies may be spaced at different distances from the vehicle's side walls.

In the past, vehicles such as buses have required a number of seats having different sizes and shapes within their interior. The majority of the seats of a forward facing variety having one of their ends attached to the side wall of the vehicle. These seats were of the pedestal of cantalever variety. Different seat models were found over the front and rear wheel wells of the buses. These were side facing seats and in many instances the length of the two forward side facing seats were different. The side facing seats mounted over the rear wheel wells of the buses in some instances were also different lengths from each other and in some instances different in length from the side facing seats at the front of the bus. In addition to the side facing seats just mentioned, a rear seat extending across the rear wall of the bus was also required. As a result, the bus manufacturer had to stock as many as five or six different model seats. This proved costly both from the amount of money tied up in inventory and also because of the amount of space required for storing so many seats during manufacturing operations. In instances where the ultimate user of the bus would maintain a spares section, he would also have to inventory as many as five or six different types of seats. This again was costly from the space requirement and from the amount of money tied up in these different models of seats in their inventory.

It is an object of the invention to provide a minimal number of seat components that can be assembled into vehicle seat assemblies of different lengths.

It is also an object of the invention to provide vehicle seat components that can be utilized for assembling both side facing seats and forward facing seats.

It is a further object of the invention to provide a novel seat mounting structure that can be attached to the basic vehicle seat components thus allowing a standard seat to be utilized even though its spacing from the side wall might be different in various vehicles.

It is a further object of the invention to provide a minimum number of standardized components that can be utilized to assemble side facing seats and forward facing seats of various lengths.

It is an additional object of the invention to provide a minimum number of standardized seat components that can be utilized to assemble various model seats to thereby reduce the amount of inventory that need be maintained on hand by either the vehicle manufacturer or the ultimate consumer as spare parts.

SUMMARY OF THE INVENTION

The vehicle seat assembly has been designed to be assembled from a minimum number of standardized components. From these standard components, a plurality of different model vehicle seat assemblies can be formed. Instead of requiring a different model of seat for various locations around a vehicle, the basic components can be assembled to form seats having different lengths and also requiring different lateral spacing from the side wall of the vehicle.

The novel vehicle seat assembly is accomplished by utilization of a plurality of seat modules of either the single occupant or double occupant variety. Each of the seat modules are molded from polycarbonate structural foam and have a shell-like structure with a back portion and a seat portion, both of which have a concave outer contour configured to receive a human body. The seat modules have side flanges integrally formed along their edges. A plurality of end arm members each have a panel section having inwardly extending flanges for supportably contacting the side flanges of the seat modules. There is a back portion support flange and a seat portion support flange. Interlocking structure is formed on the rear of the end arm members for engaging interlocking structure on the front of seat mounting adaptor members, the interlocking structure on the rear of the end arm members comprises a pair of spaced vertical channels that are interlockingly engaged with a pair of spaced vertically extending ridges that are formed on the front seat of the mounting adaptor members. The interlocking structure also has a plurality of vertically spaced T-shaped fingers on the rear of the arm members that are horizontally oriented to interlock with a plurality of vertically spaced T-shaped slots that form part of the interlocking structure on the seat mounting adaptor members.

The vehicle seat assembly may also include one or more intermediate arm members. The intermediate arm members have a panel section but they also have flanges extending laterally outwardly from both sides of the panel section, for supportably contacting the side flanges of the seat module. The intermediate arm members also have interlocking structure along their rear for detachably engaging interlocking structure on one of the seat mounting adaptor members.

It can be readily seen how the standard single occupant and double occupant seat modules can be assembled in different combinations to provide a vehicle seat assembly of any desired width. Also by the use of seat mounting adaptor members of various lengths the standard seat modules in any desired combination can be adapted to vehicle side walls of different configuations or to seats that would have a different spacing from the side wall. The use of interlocking structure along two different planes of the rear of the arm members produces a locking structure that will resist coming apart due to vibrations set up within the vehicle. Also the interlocking structure along the two different surfaces of the rear of the arm member have a perpendicular relationship in respect to each other to further insure a locking fit that will not vibrate free.

DESCRIPTION OF THE DRAWINGS

FIG. 8 is a side elevation view of an end arm member;

FIG. 8A is a front elevation view of the end arm member illustrated in FIG. 8;

FIG. 8B is a rear elevation view of the end arm member illustrated in FIG. 8;

FIG. 8C is a cross section taken along lines 8C—8C of FIG. 8;

DESCRIPTION OF THE PREFERRED EMBODIMENT

Figure 1:
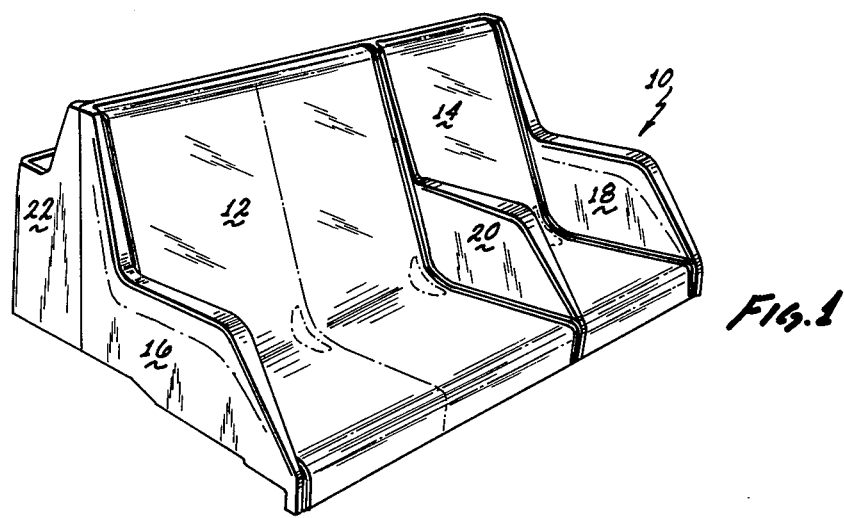
FIG. 1 is a front perspective view of one of the possible vehicle seat assembly combinations.
Figure 2:
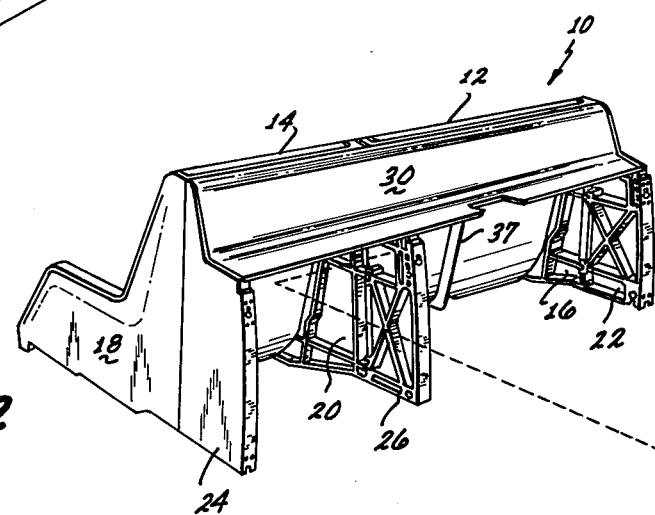
FIG. 2 is a rear perspective view of the vehicle seat assembly illustrated in FIG. 1.

Referring now to FIGS. 1 and 2 the vehicle seat assembly is generally designated numeral 10. This particular vehicle seat assembly has a double occupant module 12 and a single occupant module 14. It also has end arm members 16 and 18 and intermediate arm member 20. Interlockingly attached to the rear of end arm members 16 and 18 are seat mounting adaptor members 22 and 24 respectively. Seat mounting adaptor member 26 is attached to the rear of intermediate arm member 20. A cover member 30 is secured to the top of the various seat mounting adaptor members. Mounting plates 31 fit into the rear of the seat mounting adaptor members to engage rods or studs extending from the side of the vehicle wall.

Figure 3:
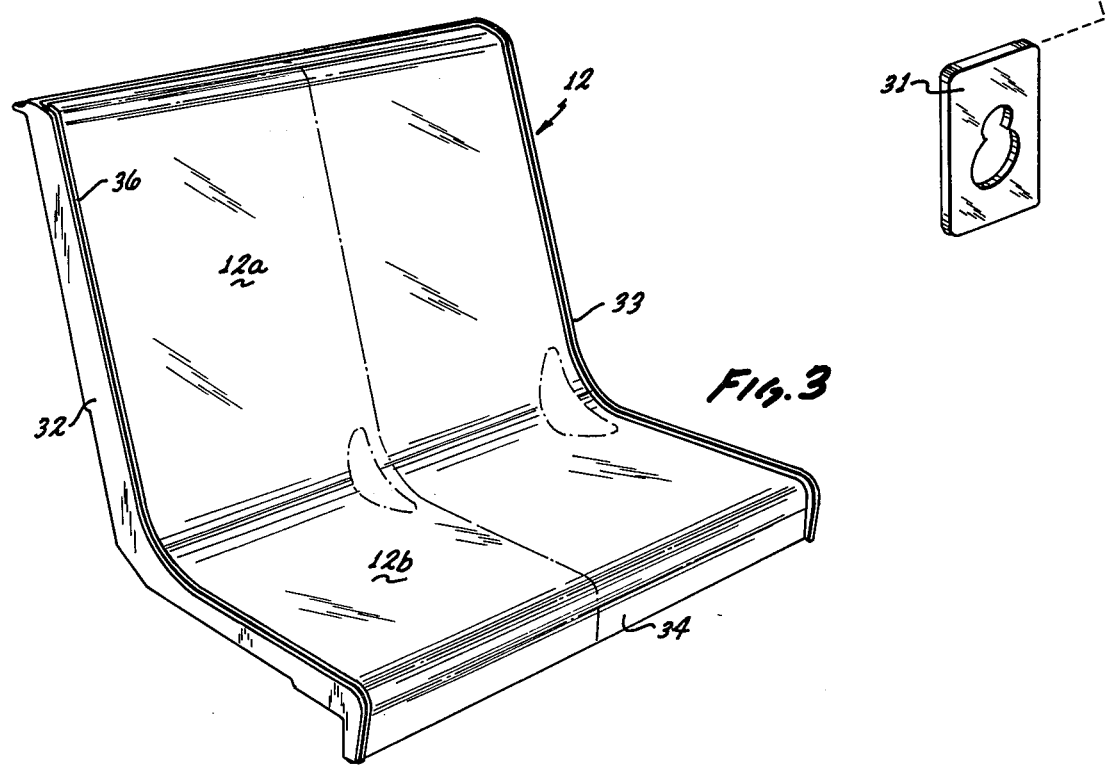
FIG. 3 is a front perspective view of a double occupant module.

The vehicle seat assemblies can be assembled from any combination of single occupant or double occupant modules. A double occupant module 12 is illustrated in FIG. 3. It has a back portion 12A and a seat portion 12B, both of which have a concave outer contour configured to receive a human body. The seat modules have a shell-like structure and they are molded from polycarbonate structural foam. Looking at FIGS. 3 and 5, the double occupant module 12 is seen to have side flanges 32 and 33. It also has a groove 36 in its front surface that extends from the left side of front lip 34 up along the left side of the seat module continuing laterally across the top of the seat module and then continuing down along the right side of the seat module until it returns to the front lip. This groove is designed to receive the edge of a seat cushion or piece of fabric that might be used to cover the seat module. One manner of covering the seat module is to insert the end of the fabric into the groove and then wedge a resilent strip of rubber or plastic into the groove to retain the edge of the fabric in place.

Figure 5A:
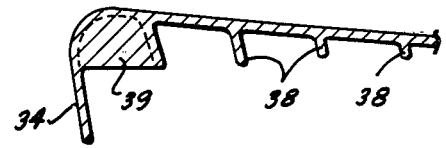
FIG. 5A is a cross section taken along lines 5A—5A of FIG. 5.
Figure 5:
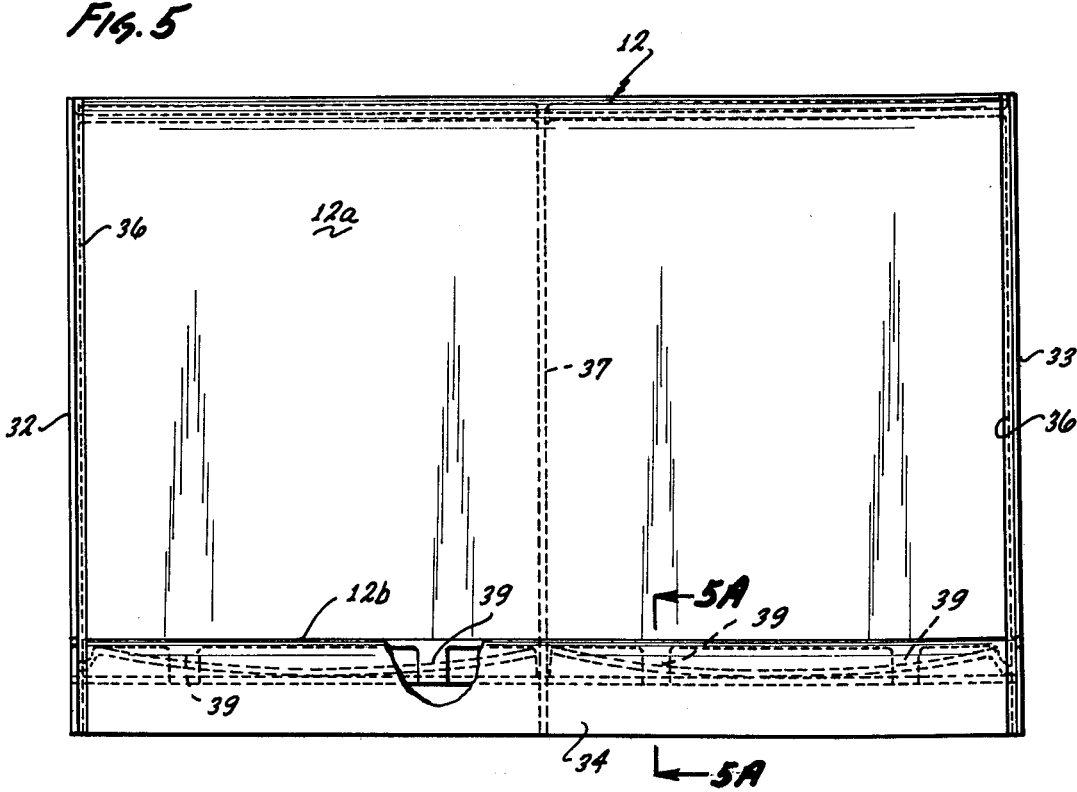
FIG. 5 is a front elevation view of the double occupant module.

In FIGS. 5 and 5A, the double occupant module 12 is seen to have a main central rib 37. Also the seat portions 12b are seen to have a plurality of reinforcing ribs 38 extending laterally across the forward underside. The seat portions 12b also have a front lip 34 that extends downwardly with a plurality of integrally molded boss members 39 laterally spaced along the inner surface for securing the seat module in place on the seat supporting structure of the vehicle.

Figure 4:
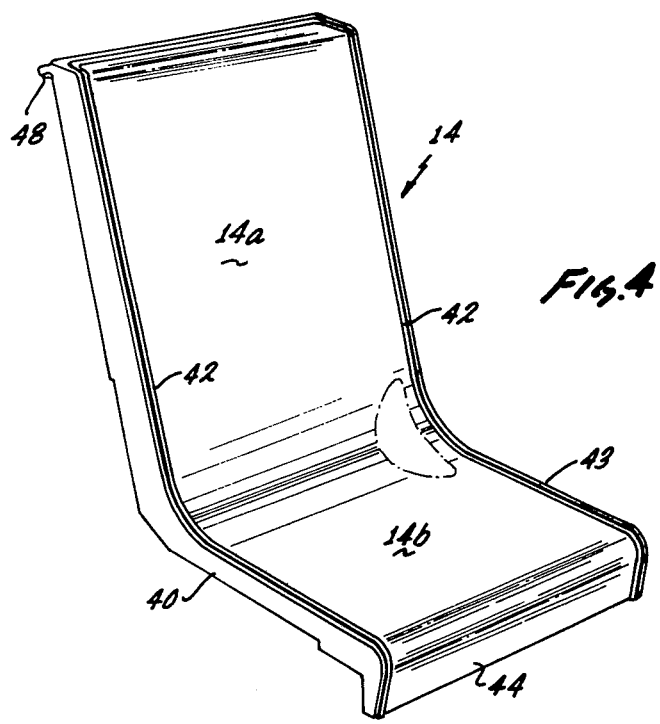
FIG. 4 is a front perspective view of a single occupant module.
Figure 6:
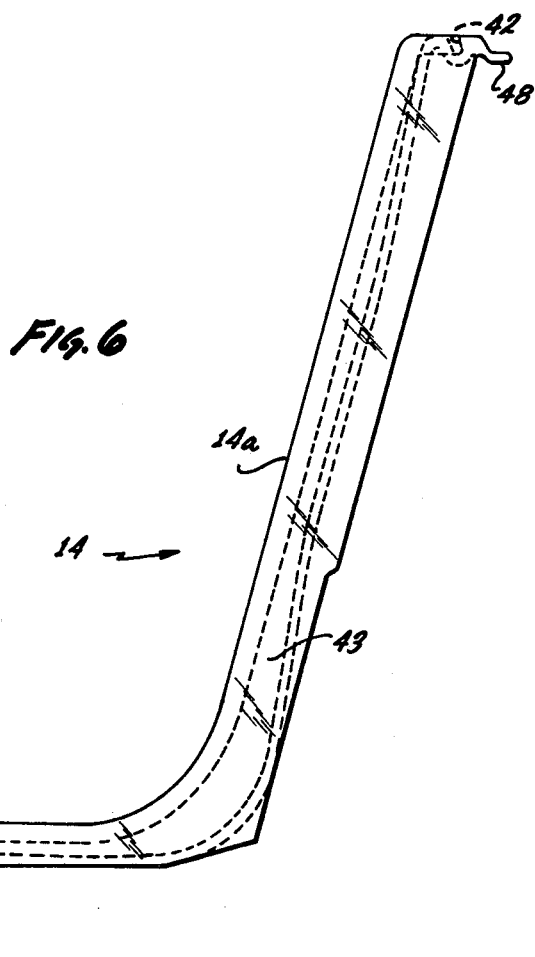
FIG. 6 is a side elevation view of a single occupant module.

A single occupant seat module 14 is seen in FIGS. 4 and 6. It has a back portion 14a and a seat portion 14b. It has side flanges 40 and 43 integrally formed along the edges of the seat and back portions. There is a groove 42 in its front surface that extends from each side of the front lip 44 up along the left side of the seat module continuing laterally along the across the top of the seat module and then continuing down along the right sides of the seat module until it returns to the front lip. This groove is designed to receive the edge of a seat cushion or piece of fabric in the same manner as does the double seat module. Reinforcing ribs 46 extend laterally across the forward underside area of the seat portion 14b. There would also be a plurality of integrally molded boss members laterally spaced along the inner surface of lip 44 for securing the seat module in place on the seat supporting structure of the vehicle. The top of the seat module has a flange 48 extending along its length to provide a support surface for the front cover member 30.

Figure 7:
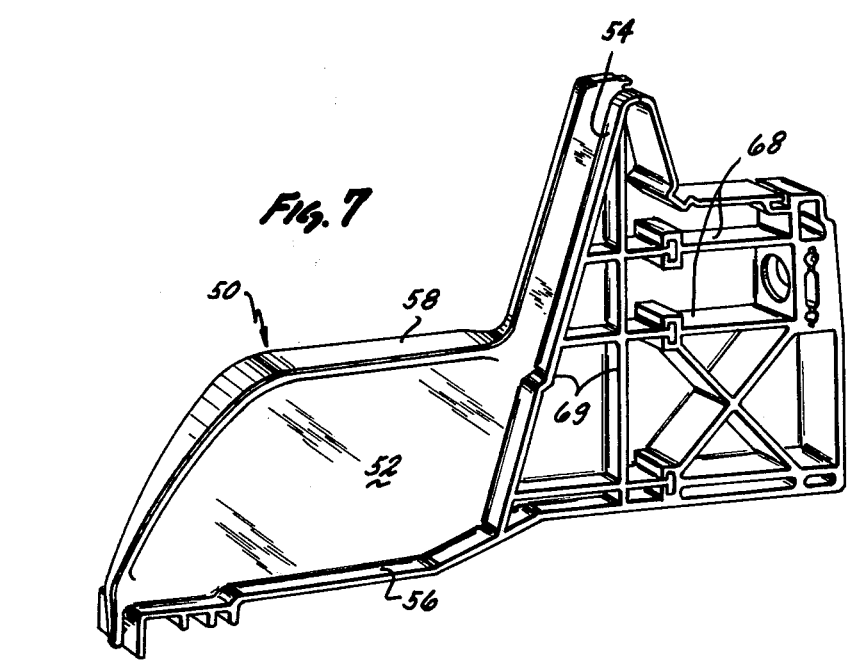
FIG. 7 is a perspective view of an end arm member interlockingly connected to a seat mounting adaptor member.

The end arm members 50 are best seen in FIGS. 7 and 8. They have a panel section 52 that has inwardly extending flanges for supportably contacting the side flanges of the seat modules. There is a back portion support flange 54 and the seat portion flange 56. The arm members 50 also have arm rest portions 58 integrally formed atop the panel sections 52. A plurality of horizontal ribs 68 and a vertical rib 69 act as reinforcing structure for the end arm members. The intermediate arm members would be similar to the end arm members except that there would be flanges extending laterally outwardly from both sides of the panel section of the intermediate arm member for supportably contacting the side flanges of the seat modules.

On the rear of the end arm members and intermediate arm members are attaching structure for interlocking seat mounting adaptor members to the arm members. A pair of spaced vertical channels 60 are formed along the rear side of the arm members and they extend the heigth of the arm member. Additional interlocking attaching structure is formed on the rear of the arm members in the form of the plurality of vertically spaced T-shaped fingers 66 that are horizontally oriented.

Figure 9:
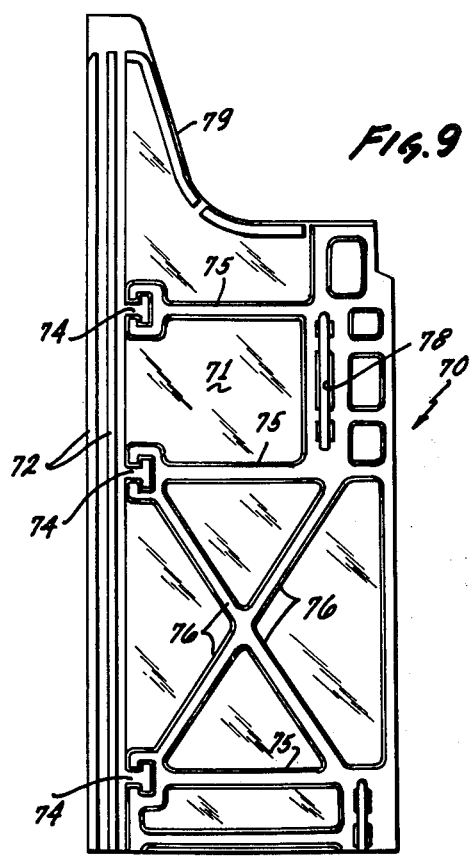
FIG. 9 is a side elevation view of a seat mounting adaptor.
Figure 9A:
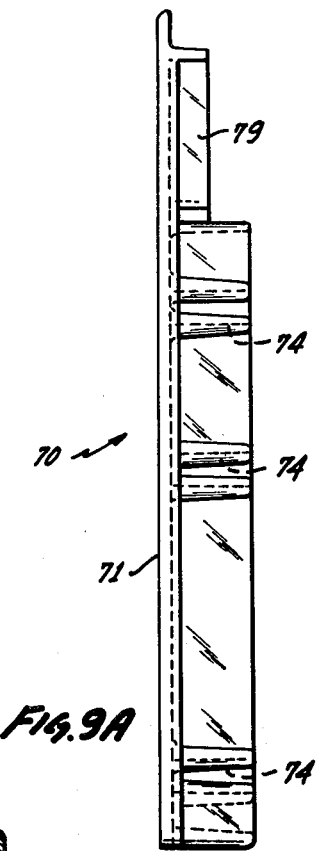
FIG. 9A is a front elevation view of the seat mounting adaptor member illustrated in FIG. 9.
Figure 9C:
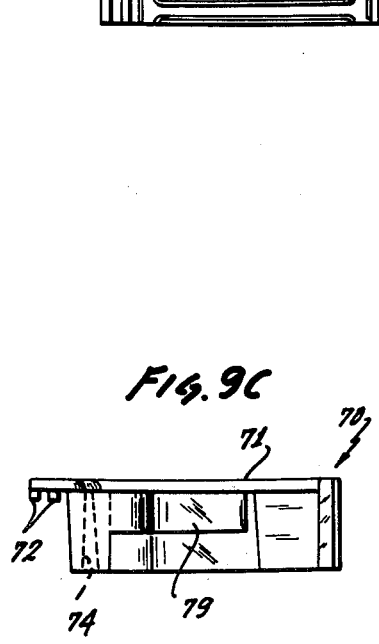
FIG. 9C is a top plan view of the seat mounting adaptor illustrated in FIG. 9.
Figure 9B:
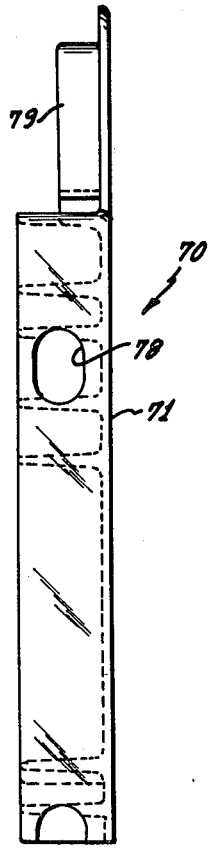
FIG. 9B is a rear elevation view of the seat mounting adaptor illustrated in FIG. 9.

The seat mounting adaptor members 70 are seen in various views in FIGS. 9A, B, and C. They have a vertical panel section 71 that has a pair of spaced vertically extending ridges 72 extending from top to bottom along the forward edge of the seat mounting adaptor member. These ridge members 72 interlock with channels 60 formed on the arm members. The seat mounting adaptor members also have a second attaching structure in the form of T-shaped slots 74 that are vertically spaced and that are oriented to interlock with the T-shaped fingers 66 extending rearwardly from the arm members. Horizontal ribs 75 and diagonal ribs 76 are utilized to reinforce the structure of the seat mounting adaptor member. The mounting plates 31 are inserted into slots 78 of the seat mounting adaptor member for attaching the same to the sidewall of the vehicle. By use of the unique structure of the vehicle seat assembly, the arm members may be standardized in size and the dimensions of the seat mounting adaptor member may be varied for differences in distance from the sidewall of the vehicle. This allows for replacement of the very inexpensive part, that is the seat mounting adaptor member, while allowing standardization of all the other components of the vehicle seat assembly.

What is claimed is:

1. A vehicle seat assembly having adaptability for use as both a side facing seat positioned along the side walls of various model vehicles and as front facing seat along the rear wall of various model vehicles comprising:

a plurality of seat modules, the combination being any six of the single occupant or double occupant variety, each of said seat modules having a shell-like structure with a back portion and seat portion, said seat modules having side flanges integrally formed along the edges of said seat and back portions;

a plurality of end arm members each having a panel section, first attaching means on the rear thereof and inwardly extending flange means for supportably contacting the side flanges of said seat modules, said flange means comprising a back portion support flange and a seat portion support flange; and seat mounting adapter members attached to said vehicles, said adapter members having second attaching means on the front thereof for engaging said first attaching means.

2. A vehicle seat assembly as recited in claim 1 wherein said seat modules are molded from polycarbonate structural foam.

3. A vehicle seat assembly as recited in claim 2 wherein said seat portions have a plurality of reinforcing ribs extending laterally across their forward underside area, said seat portions also having a front lip that extends downwardly with a plurality of integrally molded boss members laterally spaced along the inner surface for securing said seat module in place on the seat supporting structure of a vehicle.

4. A vehicle seat assembly as recited in claim 3 wherein the side flanges of said seat modules have a varying depth along their length but at all times being at least as deep as the bottom surface of said seat portion, said stiffening ribs, said bosses, or said back portion.

5. A vehicle seat assembly as recited in claim 3 wherein said seat modules have a groove in their front surface that extends from the left side of said front lip up along the left side of said seat module continuing laterally across the top of said seat module and then continuing down along the right side of said seat module until it returns to said front lip, said groove being designed to receive the edge of a seat cushion or piece of fabric that might be used to cover said seat module.

6. A vehicle seat assembly as recited in claim 1 further comprising at least one intermediate arm member having a panel section and flange means extending laterally outwardly from both sides of said panel section for supportably contacting the side flanges of said seat modules, said flange means comprising a back portion support flange and a seat portion support flange.

7. A vehicle seat assembly as recited in claim 1 wherein said end arm members have arm rest portions integrally formed atop said panel sections.

8. A vehicle seat assembly as recited in claim 1 further comprising a plurality of seat mounting adaptor members having second attaching means on their front.

9. A vehicle seat assembly as recited in claim 8 where in said first attaching means on the rear of said end are members comprises a pair of spaced vertical channels that are interlocking engaged with a pair of spaced vertically extending ridges that form part of said second attaching means on said seat mounting adaptor.

10. A vehicle seat assembly as recited in claim 9 wherein said first attaching means on the rear of said end arm members further comprises a plurality of vertically spaced T-shaped fingers that are horizontally oriented to interlock with a plurality of vertically spaced T-shaped slots that form part of said second attaching means on said seat mounting adaptor members.

* * * * *